United States Patent
Nachenberg et al.

(10) Patent No.: US 8,190,611 B1
(45) Date of Patent: May 29, 2012

(54) CATEGORIZING WEB SITES BASED ON CONTENT-TEMPORAL LOCALITY

(75) Inventors: Carey S. Nachenberg, Northridge, CA (US); Adam Bromwich, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 989 days.

(21) Appl. No.: 11/864,307

(22) Filed: Sep. 28, 2007

(51) Int. Cl.
G06F 7/00 (2006.01)
G06F 17/30 (2006.01)
(52) U.S. Cl. .................................................. 707/737
(58) Field of Classification Search .................. None
See application file for complete search history.

(56) References Cited

U.S. PATENT DOCUMENTS 6,757,691 B1 * 6/2004 Welsh et al. ........................... 1/1

OTHER PUBLICATIONS

Xue et al., "Optimizing web search using web click-through data", Proceedings of the thirteenth ACM international conference on Information and knowledge management, pp. 118-126, 2004, ACM.*
Su et al., "Correlation-based Document Clustering using Weblogs", Proc. of the 34th Hawaii International Conference on System Sciences, pp. 1-7, 2001, IEEE.*
Wu et al., "Mining web navigations for intelligence", Decision Support Systems, vol. 41, Issue 3, pp. 574-591, 2004, Elsevier B.V.*
Asur et al., "Temporal Analysis of Web Search Query-Click Data", Proc. SNA-KDD, 2009, ACM.*
Laxman et al., "A survey of temporal data mining", Sadhana vol. 31, Part 2, pp. 173-198, 2006, Springer India.*

* cited by examiner

*Primary Examiner* — Michael Hicks
(74) *Attorney, Agent, or Firm* — Fenwick & West LLP (57) ABSTRACT

A categorization server is coupled to multiple clients via a network. Each client has a security module that monitors web browsing performed on the client and reports a web site browsing stream to the categorization server. The categorization server identifies a site from the browsing stream of a client that is of a known category. The categorization server uses content-temporal locality to determine whether other sites in the browsing stream belong to the same category as the site having the known category. This determination can be performed by assigning probabilities to other sites in the browsing stream, and by considering probabilities assigned to sites in browsing streams of other clients. The categorization server provides categories of sites to the clients, and the client security modules can implement category-based security policies.

20 Claims, 7 Drawing Sheets

CATEGORIZING WEB SITES BASED ON CONTENT-TEMPORAL LOCALITY

BACKGROUND OF THE INVENTION

1. Field of the Invention

This invention pertains in general to computer security and in particular to categorizing web sites on the Internet to provide security and/or for other purposes.

2. Description of the Related Art

Modern security software monitors client web browsing in order to provide security for the user of the client and/or the enterprise at which the client is located. The security software can perform security actions based on the content of a browsed site. For example, the security software can block a user from visiting sites containing sexually explicit, job hunting, or gambling content.

Obviously, in order to provide this form of security the software must know the type of content provided by the sites that the user visits. In other words, to block sexually explicit web sites the security software must recognize that a given site provides sexually explicit content. To this end, some security software categorizes web sites based on the types of content provided by the web sites. Thus, a sexually explicit web site is categorized as "sexually explicit" and a gambling site is categorized as "gambling."

Due to the large number of potential web sites and constantly-changing nature of the Internet, however, it is extremely difficult and expensive to maintain an up-to-date web site categorization database. Generating such a database requires both web spidering/crawling capabilities as well as human and machine learning-based categorization technologies. Plus, web sites are increasingly using obfuscation techniques to thwart machine learning-based categorization. One obfuscation technique employed by web sites is displaying only images and omitting all text from a web page to prevent keyword matching-based categorization.

As a result, providers of security software often must rely on extremely expensive manual web site inspection and categorization. Accordingly, there is a need for a more efficient and cost-effective way to categorize the content provided by web sites.

BRIEF SUMMARY

The above and other problems are addressed by a method, computer-implemented system, and computer program product that categorizes a web site on a network. One embodiment of the method receives a web site browsing stream describing a sequence of web sites browsed by a client and identifies a category of a first web site in the web site browsing stream. The method determines a category of a second web site in the web site browsing stream responsive at least in part to a location of the second web site relative to the first web site in the web site browsing stream. The method further stores the determined category for the second web site.

Embodiments of the computer-implemented system comprise a computer processor and a computer-readable storage medium storing computer program modules configured to execute on the computer processor. The computer program modules comprise a communication module configured to receive a web site browsing stream describing a sequence of web sites browsed by a client. The computer program modules further comprise a web site categorization module configured to identify a category of a first web site in the web site browsing stream and to determine a category of a second web site in the web site browsing stream responsive at least in part to a location of the second web site relative to the first web site in the web site browsing stream. In addition, the computer program modules comprise a data store module configured to store the determined category for the second web site.

Embodiments of the computer program product have a computer-readable storage medium storing computer-executable code for providing category-based security, the code comprising a communication module configured to receive, from a categorization server on a network, a category for a web site browsed by a client, wherein the categorization server determined the category for the web site responsive at least in part to temporal proximities of the web site to a site having a known category in a plurality of web site browsing streams received by the categorization server from a plurality of clients. The code further comprises a policy module configured to implement a category-based security policy responsive at least in part to the category for the web site browsed by the client.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
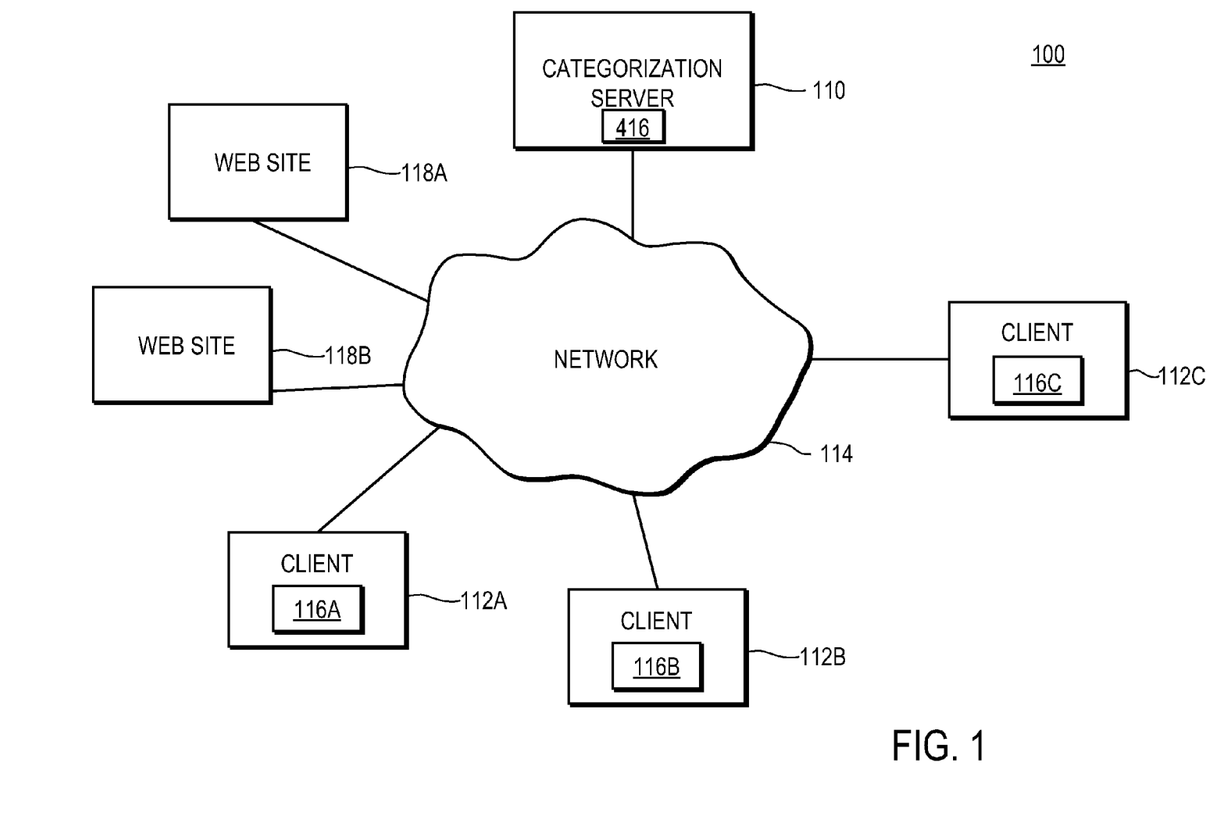
FIG. 1 is a high-level block diagram of a computing environment according to one embodiment.

FIG. 1 is a high-level block diagram of a computing environment 100 according to one embodiment. FIG. 1 illustrates a categorization server 110 and three clients 112 connected by a network 114. Two web sites 118 are also connected to the network 114. Only three clients 112 and two web sites 118 are shown in FIG. 1 in order to simplify and clarify the description. Embodiments of the computing environment 100 can have thousands or millions of clients 112 and/or web sites 118 connected to the network 114.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

In one embodiment, a client 112 is a computer used by one or more users to perform activities including browsing web sites 118 on the network 114. The client 112, for example, can be a personal computer executing a web browser such as MICROSOFT INTERNET EXPLORER that allows the user to retrieve and display content from web sites 118 and other computers on the network 114. In other embodiments, the client 112 is a network-capable device other than a computer, such as a personal digital assistant (PDA), a mobile telephone, a pager, a television "set-top box," etc. Further, in some embodiments the client 112 is a gateway server, firewall or other device that monitors the web browsing performed by one or more other clients. These latter types of devices are referred to herein as "clients" for purposes of simplicity and clarity, even if they do not fit the conventional definition of a "client."

In one embodiment, the client 112 executes a security module 116 that supports category-based security policies. The security module 116 provides the categorization server 110 with information identifying the web sites browsed by the client 112 and the temporal order in which the sites were browsed (referred to herein as a "web site browsing stream"). In addition, the security module 116 receives from the categorization server 110 information describing the one or more categories in which a browsed web site is categorized. An embodiment of the security module 116 implements category-based security policies that perform actions such as blocking access to and/or generating alerts for sites is certain categories. For example, the security module 116 can implement a security policy that blocks access to sites categorized as "sexually explicit."

A web site 118 includes a collection of one or more web pages stored on a web server. A web site 118 is identified by its uniform resource locator (URL). The browser on the client 112 uses the URL to download a web page from the site via the network 114.

Many web sites 118 can be categorized based on the types of content provided by the sites. For example, a site that provides sexually explicit content can be placed in the "sexually explicit" category. The ontology of categories into which sites 118 can be placed varies in different embodiments. Some embodiments use categories including "sexually explicit," "job hunting," "gambling," "social networking," "news," "sports," "shopping," "search," etc. Other embodiments use different and/or additional categories. Some sites are categorized in more than one category if they provide more than one type of content.

The categorization server 110 interacts with the clients 112 via the network 114. In one embodiment, the categorization server 110 includes a categorized sites list 416 describing categories of some sites on the network 114. The categorization server 110 receives the web site browsing streams from the clients 112 and uses the streams and categorized sites list 416 to categorize web sites 118 not already in the list. The categorization server 110 provides the categorizations of the web sites 118 to the clients 112, and the clients (and users of the clients) use the categorizations to implement category-based security policies. In one embodiment, the categorization server 110 constructs a client's web site browsing stream from the web site category requests it receives from that client.

The categorization server 110 relies upon a presumption that users exhibit content-temporal locality in their web browsing (i.e., surfing) habits. Thus, if a user is in the "mood" to visit sexually explicit sites, the user will probably visit a number of these sites in a single browsing session; typically the user will not visit just one site and then stop. Similarly, if a user is in "job hunting mode," the user will probably visit a variety of job-finding sites in a single browsing session. Therefore, over a limited period of time, users are likely to visit a cluster of content-related web sites 118. The categorization server 110 receives web site browsing streams from thousands or millions of clients and uses content-temporal locality to categorize web sites 118 without necessarily analyzing the web sites' actual content.

The network 114 represents the communication pathways between the categorization server 110, clients 112, and web sites 118. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
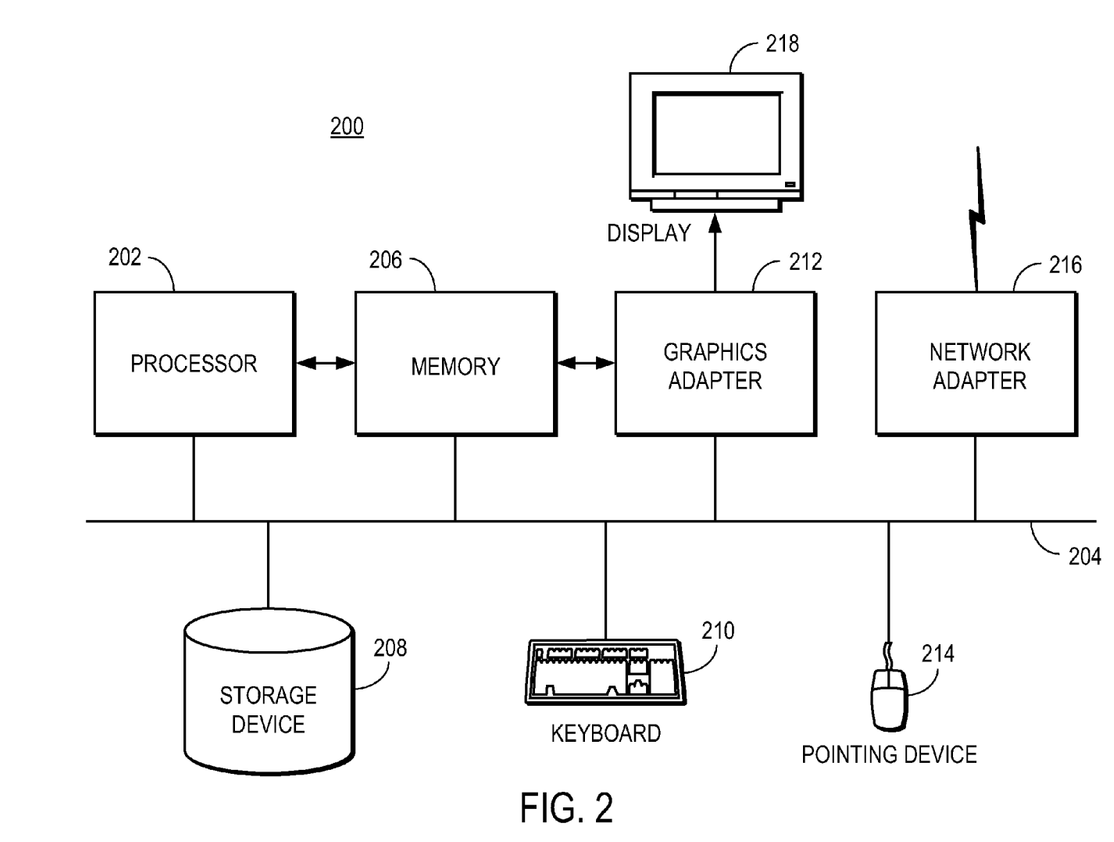
FIG. 2 is a high-level block diagram illustrating a typical computer for use as a categorization server, client, and/or web server providing a web site.

FIG. 2 is a high-level block diagram illustrating a typical computer 200 for use as a categorization server 110, client 112, and/or web server providing a web site 118. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 112 that is a mobile telephone typically has limited processing power, a small display 218, and might lack a pointing device 214. The categorization server 110, in contrast, may comprise multiple blade servers working together to provide the functionality described herein.

Figure 3:
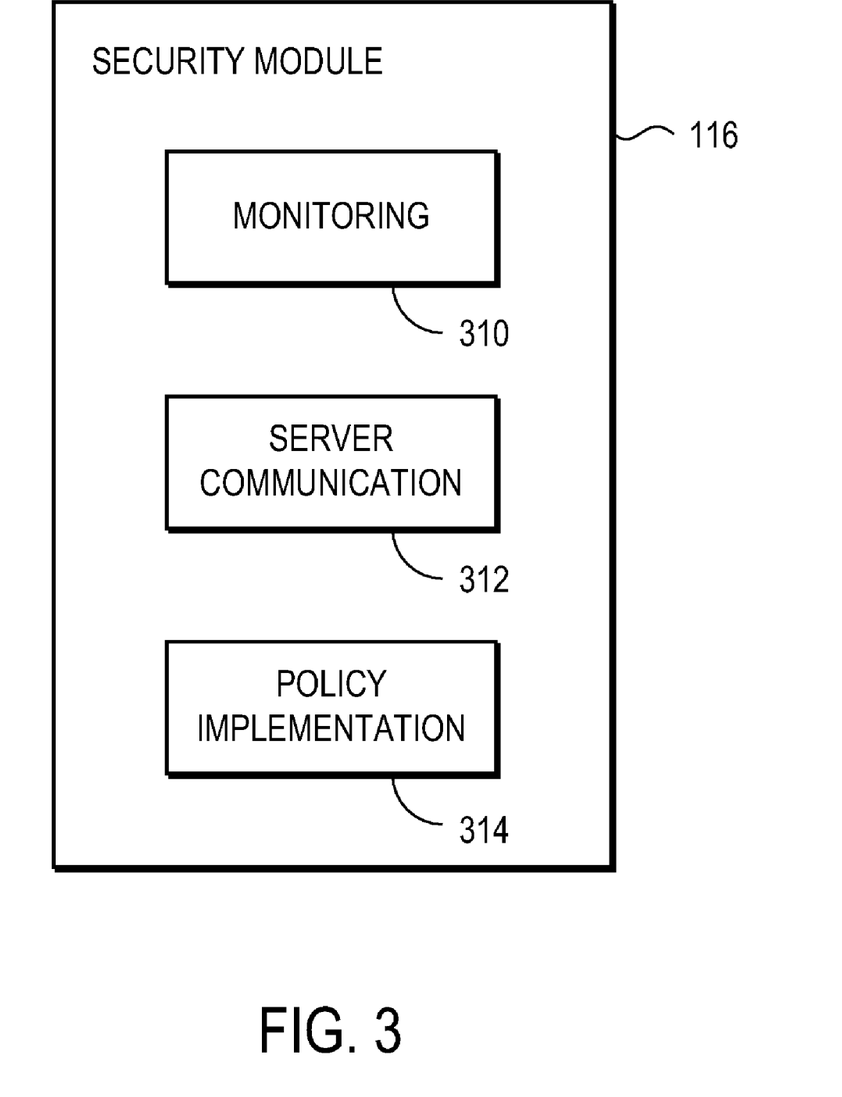
FIG. 3 is a high-level block diagram illustrating a detailed view of the security module of a client according to one embodiment.

FIG. 3 is a high-level block diagram illustrating a detailed view of the security module 116 of a client 112 according to one embodiment. In some embodiments the security module 116 is incorporated into an operating system executing on the client 112 while in other embodiments the security module is a standalone application or part of another product. As shown in FIG. 3, the security module 116 itself includes multiple modules. Those of skill in the art will recognize that other embodiments of the security module 116 can have different and/or other modules than the ones described here, and that the functionalities can be distributed among the modules in a different manner.

A monitoring module 310 monitors web site browsing performed on the client 112 (or web site browsing passing through the client if the client is, e.g., a gateway server, proxy, or firewall). The monitoring module 310 identifies the sites 118 browsed by the client 112, and the temporal order in which the client browsed the sites (i.e., the web site browsing stream). In one embodiment, the monitoring module 310 includes a component instantiated as a browser helper object that integrates into the client's web browser to monitor browsing. In another embodiment, the monitoring module 310 includes a component instantiated as a web proxy.

A server communication module 312 at the client 112 communicates with the categorization server 110 via the network 114. In one embodiment, the server communication module 312 provides reports to the categorization server 110 describing the web site browsing stream for the client 112. In one embodiment, the reports are sent only if the user of the client opts-in to this type of reporting. Moreover, the reports are anonymous in the sense that the reports do not identify the user that performed the web browsing.

The reports that the server communication module 312 sends to the categorization server 110 take different forms depending upon the embodiment. For example, one embodiment sends a report to the categorization server 110 each time the client 112 browses to a web site. The report contains the URL of the visited site, a client identifier (ID), and an optional timestamp describing when the site was visited. In one embodiment, the client ID is provided by the categorization server 110 when the security module 116 is installed on the client and serves to anonymously and uniquely identify the client. Other embodiments send batch reports based on elapsed time (e.g., sends a report every hour containing a temporally-ordered list of sites browsed during the previous hour), based on number of sites visited (e.g., sends a report containing a temporally-ordered list of the last 50 web sites visited by the client), and/or based on other factors. Some embodiments provide additional and/or different information in the reports.

In addition, an embodiment of the server communication module 312 receives information from the categorization server 110 identifying the categories into which web sites are categorized. In one embodiment, the server communication module 312 is activated when the monitoring module 310 detects that the client 112 has browsed to a new web site 118. When this event occurs, the server communication module 312 contacts the categorization server 110 and requests the category for the browsed-to web site 118. The category request can be combined with the web site browsing stream report described above. In this embodiment, the client 112 sends a single message to the categorization server 110 that incorporates both the web site browsing stream report and the request for the category of the web site 118. Other embodiments of the server communication module 312 request the category information at other times. The server communication module 312 may cache the category information for future reference.

A security policy implementation module 314 (the "policy" module) implements category-based security policies using the category information received from the categorization server 110. The security policies perform functions such as blocking access to web sites, generating alerts to the user of the client 112, and generating reports to an administrator or parent based on the categories of the web sites 118 browsed by the client 112. Thus, category-based security policies can by used by enterprises to prevent employees from browsing to prohibited types of web sites, by parents to implement control over their children's web browsing, and for other purposes.

For example, the policy module 312 can include a policy that blocks browsing of web sites categorized as "sexually explicit." The policy module 314 interacts with the monitoring 310 and server communication 312 modules and detects when the client 112 browses to a web site within this category. In accordance with the policy, the policy module 314 blocks browsing of the web site 118, displays a message to the user of the client 112 indicating that the web site was blocked, and sends a report to the administrator stating that the client 112 attempted to access a sexually explicit web site. The policy module 314 can also implement less severe policies, such as a policy that merely displays a graphical indication of the site category to the user while the user is browsing the site 118, or a policy that generates reports describing the percentage of time users at an enterprise spend browsing sites 118 of each category.

Figure 4:
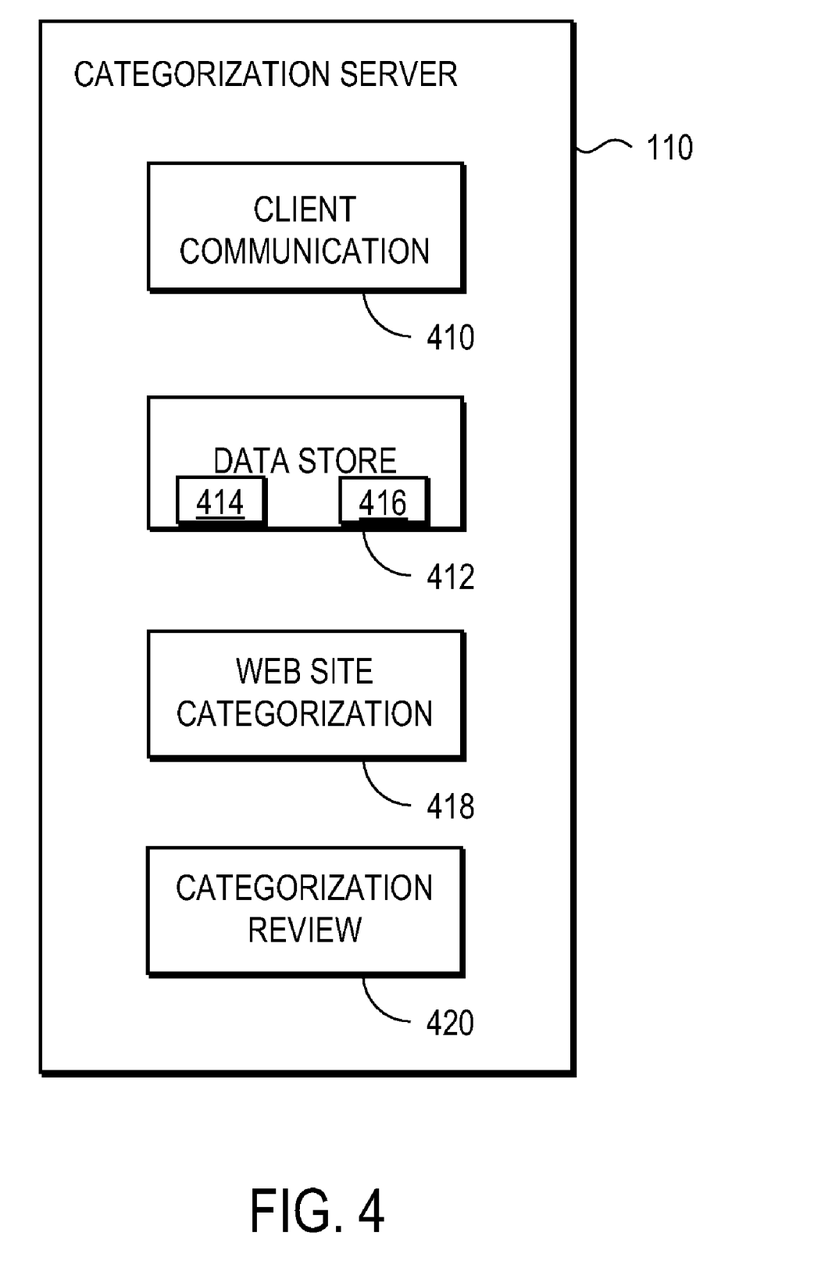
FIG. 4 is a high-level block diagram illustrating a detailed view of the categorization server according to one embodiment.

FIG. 4 is a high-level block diagram illustrating a detailed view of the categorization server 110 according to one embodiment. In one embodiment, the categorization server 110 is operated by the same entity that provides the security modules 116 to the clients 112. As shown in FIG. 4, the categorization server 110 includes several modules. Those of skill in the art will recognize that other embodiments of the categorization server 110 can have different and/or other modules than the ones described here, and that the functionalities can be distributed among the modules in a different manner. In addition, the functions ascribed to the categorization server 110 can be performed by multiple servers.

A client communication module 410 at the categorization server 110 communicates with the clients 112 via the network 114. In one embodiment, the client communication module 410 receives messages from clients 112 requesting categories for web sites 112 browsed by the clients. Further, the client communication module 410 responds to the requests by providing the clients 112 with information describing the categories to which the web sites 118 belong. The client communication module 410 can treat a request from a client 112 as an indication that the client has browsed the site 118 referenced in the request. Moreover, the time that the request was received by the categorization server 110 can serve as the timestamp indicating when the client visited the site 118. Thus, the requests from the clients 112 describe the web site browsing streams for the clients.

A data store module 412 stores the web site browsing streams received from the clients 112. Thus, the data store module 412 stores data describing the web sites 118 visited by the clients 112, and the temporal order in which the clients visited the sites. The format in which the data are stored depends upon the embodiment and how the clients 112 report the web site visiting information. In one embodiment, the data store module 412 includes a database and/or other data structure that supports retrieval of information by client ID, web site 118, and/or by timestamp. This storage supports construction of web site browsing streams for clients 112 based on analysis of the categorization requests received from the clients. For example, the storage can be used to determine the web site browsing stream for an individual client 112, the set of streams that include a particular web site 118, or the set of streams that include two or more specified web sites that were browsed in temporal proximity by any client. Depending upon the embodiment, the data store module 412 also stores other data used by the categorization server 110 in performing its functions.

An embodiment of the data store module 412 stores a seed list 414. The seed list 414 categorizes a small subset of the web sites 118 available on the network 112. The seed list 414 includes one or more web sites 118 in each category used by the categorization server 110. For example, the seed list 414 can include a well-known sex web site categorized as "sexually explicit," a well-known job hunting site classified as "job seeking," and a well-known gambling site classified as "gambling." However, the web sites 118 in the seed list 414 need not be well known. The seed list 414 also need not be dynamic; a list that is accurate at the time the categorization server 110 becomes operational will suffice. In one embodiment, the seed list 414 is purchased from a provider that specializes in such site categorization lists, such as from Websense, Inc. of San Diego, Calif.

An embodiment of the data store module 412 also stores the list of categorized sites 416. This list 416 stores the web site categorizations made by the categorization server 110. The list of categorized sites 416 thus becomes more comprehensive than the seed list 414 as the categorization server 110 operates. New categorizations that are stored in the list of categorized sites 416 can contribute to future categorizations of other, uncategorized, web sites 118.

A web site categorization module 418 (the "categorization" module) categorizes web sites 118 based on the web site browsing streams received from the clients 112, the seed list 414, and/or the list of categorized sites 416. As mentioned above, the categorization module 418 operates on the premise that users exhibit content-temporal locality in their browsing habits. Thus, if a client 112 browses a site that is categorized in the seed list 414, the categorization module 418 posits probabilities that other sites visited by the client in temporal proximity to that site are of the same category. The categorization module 418 considers the probabilities across multiple client web site browsing streams in order to accurately categorize the sites browsed by the clients that are not in the seed list 414. The categories for these other sites are stored in the list of categorized sites 416 and used to support subsequent site categorizations.

Stated another way, assume that the stream of web sites visited by a particular client X is defined as $S_x=\{U_1, U_2, U_3, \ldots U_n\}$, where "U" is a web site identified by a URL. The categorization module 418 looks up each of the sites 118 in the seed 414 and site categorization 416 lists. If at least one of the sites 118, say $U_{15}$, is in a list and therefore categorized, then the categorization module 418 knows that the client has visited at least one, and possibly multiple, sites of this category. In fact, there is a high probability that the sites temporally-proximate to site $U_{15}$, such as sites $U_{12}$, $U_{13}$, $U_{14}$, $U_{16}$, $U_{17}$ or $U_{18}$, belong in the same category, given the content-temporal locality of web browsing. Thus, the categorization module 418 marks the set of sites surrounding $U_{15}$ as possibly within the same category.

The categorization module 418 repeats this process across many clients 112. Assume that the categorization module 418 finds that site $U_{17}$ was visited 100,000 times, and in a large fraction of these visits it was visited within several minutes of a visit to a site in the same category as $U_{15}$ (e.g., sexually explicit). Therefore, there is an extremely high probability that $U_{17}$ is of the same category as $U_{15}$. If, on the other hand, the categorization module 418 finds that a site 118 is visited in isolation of other known sites of a given category (across thousands or millions of clients 112), this finding reduces the likelihood that the site is a member of any of the tracked categories.

There are numerous ways for the categorization module 418 to perform the web site categorization process described above. In one embodiment, the categorization module 418 assigns every web site 118 visited within ±M minutes of a known, categorized site the same probability of being of the same category. This probability can be constant (e.g., always 1%), or can be derived based on the percent or number of sites visited during the browsing session that are known to be in the same category. For example, if 20% of the sites visited during a browsing session are classified as sexually explicit, the categorization module 418 gives all sites visited within ±M minutes a 20% chance of also being sexually explicit.

In another embodiment, the categorization module 418 assigns the web sites 118 visited within ±M minutes of a visit to a known categorized site a set of probabilities, according to a Gaussian or other statistical distribution. The distribution is centered around the known, categorized site. Sites visited immediately (e.g., seconds) before or after the visit to the categorized site have the highest probability of being of the same category. Sites visited much earlier/later (e.g., minutes) than the categorized site have a lower probability of being of the same category.

In one embodiment, the probabilities assigned by the categorization module 418 differ based on the category under consideration and/or other factors. For example, the categorization module 418 can determine that there is high content-temporal locality for sexual explicit sites, but only moderate content-temporal locality for sports and/or shopping sites. The probabilities assigned to web sites in temporal proximity to a known site are adjusted based on the known site's category.

In some embodiments, the techniques described above are applied across the web site browsing streams from all of the clients 112 in order to produce accurate probabilities that sites 118 are of given categories. One embodiment of the categorization module 418 uses the probabilities computed for a site across the different client web site browsing streams as inputs to a Kalman filter. The filter narrows the Gaussian distribution to a single probability indicating whether that a site is of a given category. Other embodiments use one or more classifiers that use boosting algorithms to evaluate the probabilities that a site is of a given classification. Some embodiments use averaging and thresholding to categorize a site. For example, an embodiment of the categorization module 418 averages all of the probabilities that a site is of a given category across all of the client web site browsing streams, and then classifies the site according to the value of the average (e.g., >90%=definitely within the category, 50-89%=probably within the category). Other embodiments use different techniques.

In one embodiment, the output of the categorization module 418 is received by a categorization review module 420 (the "review module"). This latter module 420 uses the probabilities assigned by the categorization module 418 to prioritize and/or triage sites for manual review by human site reviewers. For example, the review module 420 can be configured to identify all sites that the categorization module 418 determines are at least 75% likely to belong to a given category. A human reviewer interacts with the review module 420 to review and verify the categorization of the identified sites.

Figure 5:
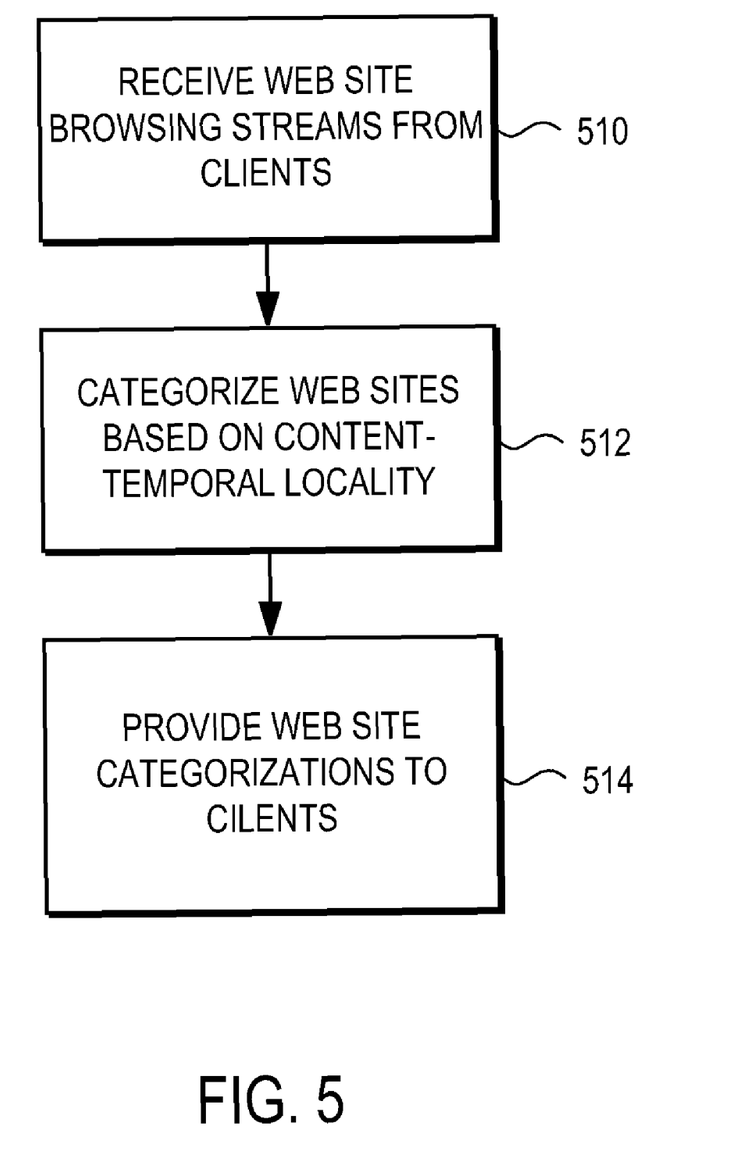
FIG. 5 is a flowchart illustrating steps performed by the categorization server to provide web site categorizations to clients according to one embodiment.

FIG. 5 is a flowchart illustrating steps performed by the categorization server 110 to provide web site categorizations to clients 112 according to one embodiment. Other embodiments perform the illustrated steps in different orders, and/or perform different or additional steps. Moreover, some or all of the steps can be performed by entities other than the categorization server 110. Those of skill in the art will recognize that embodiments of the categorization server 110 simultaneously communicate with multiple clients 112 and categorize multiple sites 118. Therefore, embodiments of the categorization server 110 may perform multiple instances of the steps of FIG. 5 simultaneously.

The categorization server 110 receives 510 web site browsing streams from the clients 112. In one embodiment, a unit of the browsing stream is formed of a request from a client 112 for a category of a web site 118 that includes a client ID, the URL of the site, and an optional timestamp. The categorization server 110 categorizes 512 one or more of the web sites 118 in the web site browsing stream based on content-temporal locality. The categorization server 110 determines whether any of the sites in the stream are in the seed list 414 or in the categorized sites list 416. Sites in the stream of unknown categories are assigned probabilities that they are of the known category based on the sites' temporal proximity to the site or sites of known category. The categorization server 110 evaluates the assigned probabilities across multiple client web site browsing streams in order to categorize 512 the sites. The categorization server 110 provides 514 the web site 118 categories to the clients 112 in response to the requests.

Figure 6A:
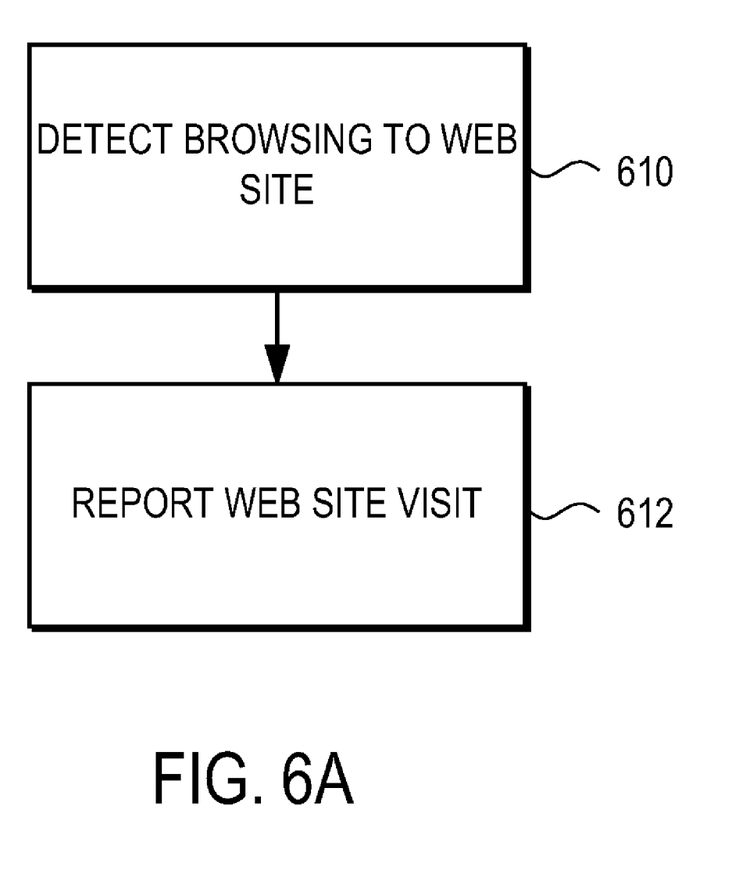
FIG. 6A is a flowchart illustrating steps performed by the security module in the client to report web site browsing to the categorization server according to one embodiment.

FIG. 6A is a flowchart illustrating steps performed by the security module 116 in the client 112 to report web site browsing to the categorization server 110 according to one embodiment. Other embodiments perform the illustrated steps in different orders, and/or perform different or additional steps. Moreover, some or all of the steps can be performed by entities other than the security module 116.

The security module 116 detects 610 when the client 112 browses to a web site 118. In one embodiment, the security module 116 monitors the client web browser to observe web browsing activity. Upon detecting that the client 112 browsed to a web site 118, an embodiment of the security module 116 sends 612 a report to the categorization server 110 identifying the client, the visited web site, and an optional timestamp indicating the time of the visit. The security module 116 can send 612 multiple reports during a web site browsing session, thereby forming a web site browsing stream for the client 112.

Figure 6B:
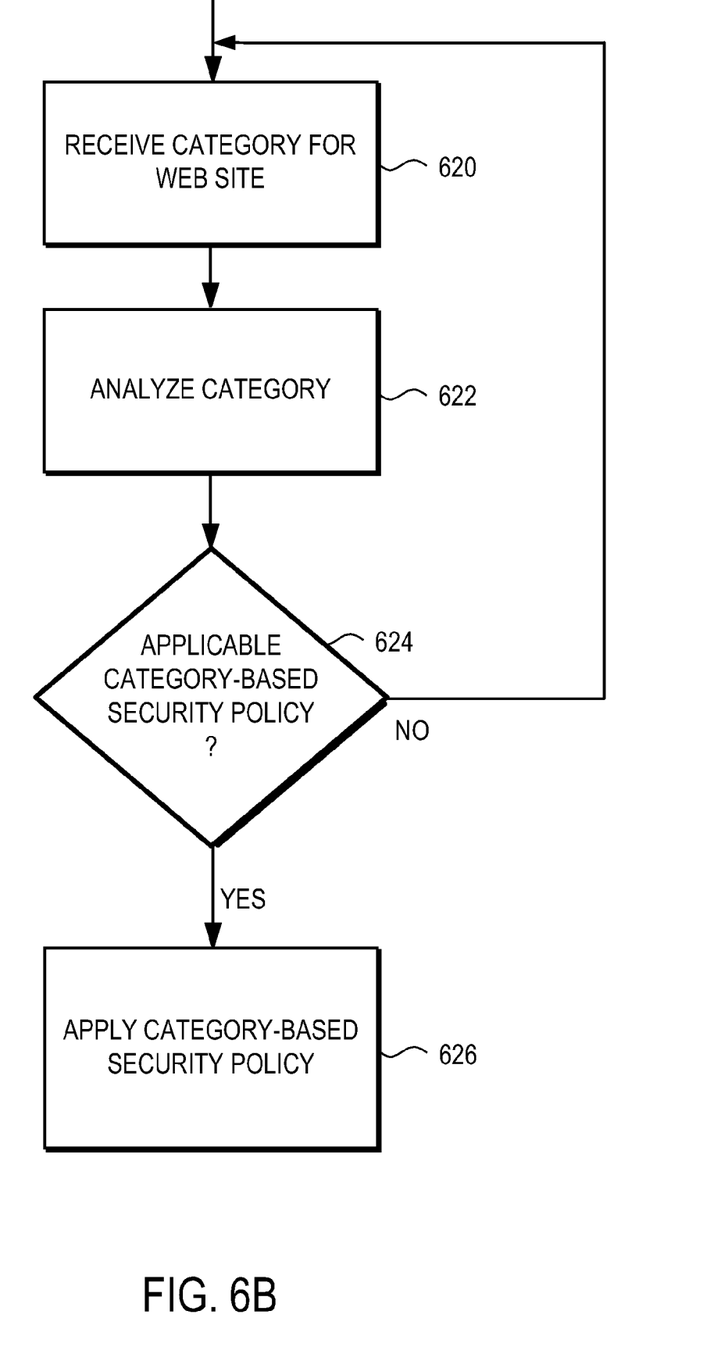
FIG. 6B is a flowchart illustrating steps performed by the security module to apply a category-based security policy according to one embodiment.

FIG. 6B is a flowchart illustrating steps performed by the security module 116 to apply a category-based security policy according to one embodiment. Other embodiments perform the illustrated steps in different orders, and/or perform different or additional steps. Moreover, some or all of the steps can be performed by entities other than the security module 116.

The security module 116 receives 620 a category classification for a web site 118 from the categorization server 110. In one embodiment, the security module 116 detects when the client 112 browses to a web site 118 and requests the category for the site from the categorization server 110 as part of the report to the categorization server 110 described above with respect to step 612.

The security module 116 analyzes 622 the category and determines 624 whether it has a security policy applicable to it. For example, if the web site 118 is categorized as sexually explicit, the security module 116 determines 624 whether it has a security policy applicable to sexually explicit web sites. If 624 there is no applicable security policy (or the applicable policy specifies to perform no action), an embodiment of the security module 116 allows the web browsing to proceed. If 624, on the other hand, there is an applicable security policy, the security module applies 626 the policy by performing a specified action. The policy can, for example, block browsing of the web site 118, display a message to the user of the client 112, and/or send a report to an site reviewer or parent.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of categorizing a web site on a network, comprising:
   using a computer to perform steps comprising:
   receiving a web site browsing stream describing temporal proximities of web sites browsed by a client, wherein a temporal proximity indicates a time interval between visits to browsed web sites;
   identifying a category of a first web site in the web site browsing stream;
   determining a temporal proximity of a second web site relative to the first web site in the web site browsing stream;
   determining a probability that the second web site is of a same category as the first web site in the web site responsive at least in part to the temporal proximity of the second web site relative to the first web site and a degree of content-temporal locality for the category of the first web site; and
   storing the determined category probability for the second web site.

2. The method of claim 1, wherein receiving a web site browsing stream comprises:
   receiving a client identifier identifying the client; and
   receiving a uniform resource locator (URL) referencing a web site browsed by the client.

3. The method of claim 1, wherein identifying the category of the first web site in the web site browsing stream comprises:
   accessing a seed list, the seed list identifying web sites in categories in which other web sites on the network can be categorized.

4. The method of claim 1, further comprising:
   receiving a plurality of web site browsing streams describing temporal proximities of web sites browsed by a plurality of clients; and
   identifying web sites in the plurality of web site browsing streams that are of the same category as the first web site;
   wherein the probability that the second web site is of the same category as the first web site is determined responsive at least in part to temporal proximities of the second web site relative to the web sites in the plurality of web site browsing streams that are of the same category as the first web site and the degree of content-temporal locality of the category of the first web site.

5. The method of claim 1, wherein a category of a web site identifies a type of content provided by the web site.

6. The method of claim 1, further comprising:
   determining a category of the second web site based on the probability that the second web site is of the same category as the first web site and a probability that the second web site is of a same category as a third web site in the web site browsing stream, the first and third web sites having different categories and different degrees of content-temporal locality.

7. The method of claim 6, further comprising:
providing the determined category of the second web site to the client.

8. The method of claim 1, wherein different categories of web sites have different degrees of content-temporal locality and wherein determining a probability that the second web site is of the same category as the first web site comprises adjusting the probability that the second web site is of the same category as the first web site responsive to the degree of content-temporal locality for the category of the first web site.

9. A computer-implemented system for categorizing a web site on a network, comprising:
a computer processor; and
a computer-readable storage medium storing computer program modules configured to execute on the computer processor, the computer program modules comprising:
  a communication module configured to receive a web site browsing stream describing temporal proximities of web sites browsed by a client, wherein a temporal proximity indicates a time interval between visits to browsed web sites;
  a web site categorization module configured to:
    identify a category of a first web site in the web site browsing stream;
    determine a temporal proximity of a second web site relative to the first web site in the web site browsing stream; and
    determine a probability that the second web site is of a same category as the first web site responsive at least in part to the temporal proximity of the second web site relative to the first web site and a degree of content-temporal locality for the category of the first web site; and
  a data store module configured to store the determined category probability for the second web site.

10. The computer-implemented system of claim 9, wherein the client communication module is configured to:
receive a client identifier identifying the client;
receive a uniform resource locator (URL) referencing a web site browsed by the client; and
receive a timestamp specifying a time at which the client browsed the web site referenced by the URL.

11. The computer-implemented system of claim 9, wherein the web site categorization module is configured to:
access a seed list, the seed list identifying web sites in categories in which other web sites on the network can be categorized.

12. The computer-implemented system of claim 9, the computer program modules further comprising:
a review module configured to prioritize and/or triage the second web site for manual review responsive at least in part to the determined probability.

13. The computer-implemented system of claim 9, wherein the web site categorization module is further configured to:
receive a plurality of web site browsing streams describing temporal proximities of web sites browsed by a plurality of clients; and
identify web sites in the plurality of web site browsing streams that are of the same category as the first web site;
wherein the probability that the second web site is of the same category as the first web site is determined responsive at least in part to temporal proximities of the second web site relative to the web sites in the plurality of web site browsing streams that are of the same category as the first web site and the degree of content-temporal locality of the category of the first web site.

14. The computer-implemented system of claim 9, wherein the web site categorization module is configured to:
determine a category of the second web site based on the probability that the second web site is of the same category as the first web site and a probability that the second web site is of a same category as a third web site in the web site browsing stream, the first and third web sites having different categories and different degrees of content-temporal locality.

15. A non-transitory computer-readable storage medium storing computer program modules for categorizing a web site on a network, the modules comprising:
a communication module configured to receive a web site browsing stream describing temporal proximities of web sites browsed by a client, wherein a temporal proximity indicates a time interval between visits to browsed web sites;
a web site categorization module configured to:
  identify a category of a first web site in the web site browsing stream;
  determine a temporal proximity of a second web site relative to the first web site in the web site browsing stream; and
  determine a probability that the second web site is of a same category as the first web site responsive at least in part to the temporal proximity of the second web site relative to the first web site and a degree of content-temporal locality for the category of the first web site; and
a data store module configured to store the determined probability for the second web site.

16. The computer-readable storage medium of claim 15, wherein the communication module is configured to:
receive a client identifier identifying the client;
receive a uniform resource locator (URL) referencing a web site browsed by the client; and
receive a timestamp specifying a time at which the client browsed the web site referenced by the URL.

17. The computer-readable storage medium of claim 15, wherein the web site categorization module is configured to:
access a seed list, the seed list identifying web sites in categories in which other web sites on the network can be categorized.

18. The computer-readable storage medium of claim 15, wherein the web site categorization module is further configured to:
receive a plurality of web site browsing streams describing temporal proximities of web sites browsed by a plurality of clients; and
identify web sites in the plurality of web site browsing streams that are of the same category as the first web site;
wherein the probability that the second web site is of the same category as the first web site is determined responsive at least in part to temporal proximities of the second web site relative to the web sites in the plurality of web site browsing streams that are of the same category as the first web site and the degree of content-temporal locality of the category of the first web site.

19. The computer-readable storage medium of claim 15, wherein the web site categorization module is configured to:
determine a category of the second web site based on the probability that the second web site is of the same category as the first web site and a probability that the second web site is of a same category as a third web site in the web site browsing stream, the first and third web sites having different categories and different degrees of content-temporal locality.

20. The computer-readable storage medium of claim 15, wherein different categories of web sites have different degrees of content-temporal locality and wherein determining a probability that the second web site is of the same category as the first web site comprises adjusting the probability that the second web site is of the same category as the first web site responsive to the degree of content-temporal locality for the category of the first web site.

* * * * *

UNITED STATES PATENT AND TRADEMARK OFFICE
CERTIFICATE OF CORRECTION

| | |
|---|---|
| PATENT NO. | : 8,190,611 B1 |
| APPLICATION NO. | : 11/864307 |
| DATED | : May 29, 2012 |
| INVENTOR(S) | : Carey S. Nachenberg et al. |

It is certified that error appears in the above-identified patent and that said Letters Patent is hereby corrected as shown below:

Column 10, line 30, after "as the first web site" delete "in the web site".
Column 10, line 35, after "determined" delete "category".
Column 11, line 38, after "determined" delete "category".

Signed and Sealed this
Eighteenth Day of September, 2012

David J. Kappos
*Director of the United States Patent and Trademark Office*